(12) United States Patent
Kemppainen et al.

(10) Patent No.: US 11,958,541 B2
(45) Date of Patent: Apr. 16, 2024

(54) OUTRIGGER HAVING INCREASED STIFFNESS

(71) Applicant: Toyota Motor Engineering & Manufacturing North America, Inc., Plano, TX (US)

(72) Inventors: Jacob M. Kemppainen, Chelsea, MI (US); Scott B. Smith, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 175 days.

(21) Appl. No.: 17/488,617

(22) Filed: Sep. 29, 2021

(65) Prior Publication Data

US 2023/0099867 A1 Mar. 30, 2023

(51) Int. Cl.
*B62D 33/06* (2006.01)
*B62D 21/02* (2006.01)

(52) U.S. Cl.
CPC ......... *B62D 33/0604* (2013.01); *B62D 21/02* (2013.01)

(58) Field of Classification Search
CPC ............................ B62D 33/0604; B62D 21/02
USPC .................................. 296/35.1, 190.07, 204
See application file for complete search history.

(56) References Cited

U.S. PATENT DOCUMENTS

| | | | | |
|---|---|---|---|---|
| 3,479,081 A | * | 11/1969 | Schaaf | B60G 99/004 296/35.1 |
| 5,641,261 A | * | 6/1997 | Talbert | B66F 9/07563 414/664 |
| 6,234,568 B1 | | 5/2001 | Aoki | |
| 6,733,040 B1 | * | 5/2004 | Simboli | B62D 21/09 296/187.02 |
| 7,819,463 B2 | * | 10/2010 | Werner | B62D 33/02 296/183.1 |
| 10,137,933 B2 | * | 11/2018 | Chiang | B62D 21/152 |
| 10,889,334 B2 | * | 1/2021 | Tatsuwaki | B62D 25/2036 |
| 2008/0315611 A1 | | 12/2008 | Durocher | |
| 2010/0078969 A1 | * | 4/2010 | Boettcher | B62D 21/02 296/193.09 |
| 2015/0246690 A1 | * | 9/2015 | Matsumoto | B62D 21/152 296/187.1 |
| 2018/0118272 A1 | * | 5/2018 | Nishikawa | B62D 21/02 |
| 2019/0308665 A1 | * | 10/2019 | Tasaka | B62D 21/152 |

FOREIGN PATENT DOCUMENTS

| | | |
|---|---|---|
| CN | 205769595 U | 12/2016 |
| JP | 2020083126 A | 6/2020 |
| WO | 2015/008640 A1 | 1/2015 |

* cited by examiner

*Primary Examiner* — Pinel E Romain
(74) *Attorney, Agent, or Firm* — Dinsmore & Shohl LLP

(57) ABSTRACT

An outrigger coupled to a cab frame. The outrigger including a base wall, a first side wall, an opposite second side wall, a reinforcement flange, and a reinforcement bracket. The first side wall and the opposite second side wall extend from the base wall. Each of the first side wall and the second side wall include an interior edge, an opposite exterior edge, and an inner surface. The reinforcement flange extends along the exterior edge of the first side wall, the second edge, and the exterior edge of the second side wall. The reinforcement bracket is coupled to the interior edge of the first side wall and the interior edge of the second side wall.

20 Claims, 4 Drawing Sheets

OUTRIGGER HAVING INCREASED STIFFNESS

TECHNICAL FIELD

The present specification generally relates to outriggers for vehicles and, more specifically, apparatus to outriggers for vehicles which reduce excess interior cabin noise.

BACKGROUND

Conventional body-on-frame vehicles may suffer from excess interior cabin noise. The excess interior cabin noise may be due to gear noise from a differential for the vehicle. The gear noise generates resonant frequencies which travel through a frame of the vehicle which in turn travel into the cabin interior. One component which connects the cabin to the frame is an outrigger, therefore the outrigger is within the travel path of the resonant frequencies before entering the cabin interior.

Accordingly, a need exists for an improved outrigger that may reduce the level of vibration at the outrigger to decrease the amount of interior cabin noise.

SUMMARY

In one embodiment, an outrigger is coupled to a cab frame. The outrigger including a base wall, a first side wall, an opposite second side wall, a reinforcement flange, and a reinforcement bracket. The first side wall and the opposite second side wall extend from the base wall. Each of the first side wall and the second side wall include an interior edge, an opposite exterior edge, and an inner surface. The reinforcement flange extends along the exterior edge of the first side wall, the second edge, and the exterior edge of the second side wall. The reinforcement bracket is coupled to the interior edge of the first side wall and the interior edge of the second side wall.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
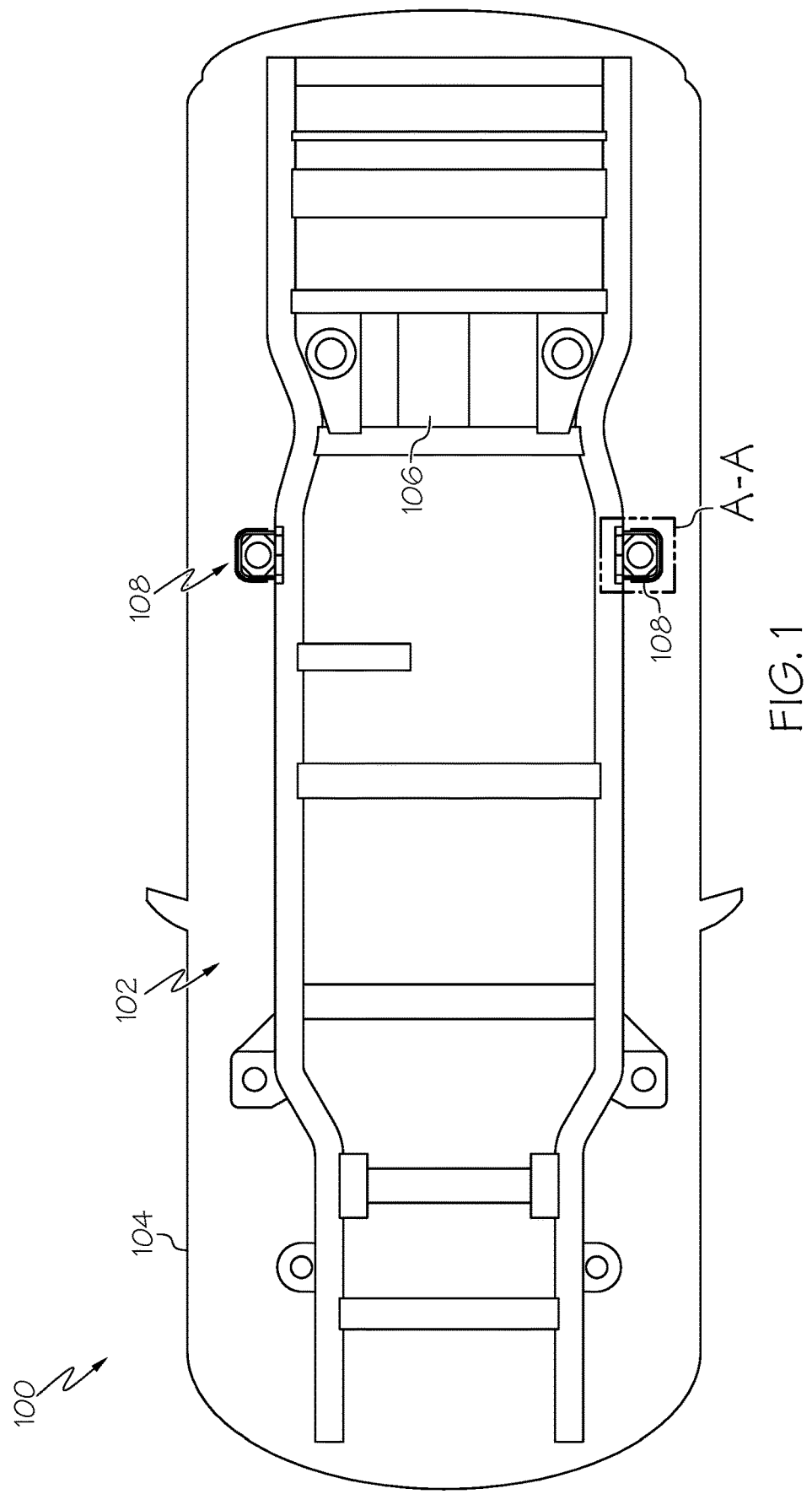
FIG. 1 schematically depicts a top view of a frame skeleton of a frame vehicle, according to one or more embodiments shown and described herein.

Embodiments described herein are directed to an outrigger that includes structural elements in order to increase the stiffness and rigidity of the outrigger. By increasing the stiffness and rigidity, the outrigger is able to absorb higher vibrations from a rear differential of the vehicle. Accordingly, noise to an interior cabin of the vehicle is reduced.

The outrigger includes a reinforcement flange extending along the side walls of the outrigger and a reinforcement bracket coupled to interior edges of the side walls. Various embodiments of the apparatus and the operation of the apparatus are described in more detail herein. Whenever possible, the same reference numerals will be used throughout the drawings to refer to the same or like parts.

Referring now to FIG. 1, a top view of a of a frame vehicle 100 is illustrated according to one or more embodiments described herein. The frame vehicle 100 may generally include a frame skeleton 102 (e.g., chassis, frame member). The frame skeleton 102 provides the supporting structure of the vehicle in which most other components (e.g., powertrain, differential, suspension) of the vehicle are attached. In some embodiments, the frame vehicle 100 is a body-on-frame vehicle. In body-on-frame vehicles, a cabin 104 (e.g., coach, body) is coupled directly to the frame skeleton 102.

The frame skeleton 102 is coupled to a rear differential 106 (e.g., transaxle) for the frame vehicle 100. The rear differential 106 operatively drives a pair of wheels of the frame vehicle 100 to allow each wheel to rotate at different speeds. In order to do so, the rear differential 106 is comprised of a plurality of gears that are in mesh. While in mesh, the gear teeth of the plurality of gears create gear teeth noise (e.g., mesh noise). The gear teeth noise creates vibrations into the frame skeleton 102 in the form of resonance frequencies. In some embodiments, the resonance frequency range between 300-700 Hz. In some embodiments, the resonance frequency range between 200-500 Hz. In some embodiments, the resonance frequency range between 400-900 Hz. In some embodiments, the rear differential 106 is a front differential or a center differential. In some embodiments, the frame vehicle 100 includes more than one rear differential 106.

Due to the cabin 104 being positioned directly onto the frame skeleton 102, the resonance frequencies are transmitted into the cabin 104 in the form of audible noise. The audible noise may be disruptive to the operator and passengers of the frame vehicle 100. The resonance frequency value is directly correlated to the interior noise. Therefore, it is advantageous to reduce the resonance frequency before it enters the cabin 104.

The frame skeleton 102 is coupled to an outrigger 108. The outrigger 108 is used to mount the cabin 104 onto the frame skeleton 102 using cab mounts (not shown). The outrigger 108 is further configured to assist in stabilizing the cabin 104 to the frame vehicle 100. When a load is applied onto the frame vehicle 100 (e.g., when loaded with equipment, towing, hoisting) the outrigger 108 is configured to deform in a controlled manner. As discussed in greater detail herein, components of the outrigger 108 translate in order to better absorb loads and vibrations placed onto the frame vehicle 100. The controlled deformation mode is also known as the breathing mode of the outrigger 108.

The outrigger 108 may be a rear cab mounted frame outrigger when the frame vehicle 100 has a rear differential 106. The outrigger 108 is positioned near the rear differential 106 in order to absorb the resonance frequencies from the rear differential 106. In embodiments where the frame vehicle 100 includes a front differential (e.g., transaxles), a center differential (e.g., for 4×4, and all-wheel drive vehicles), or multiple differentials, outriggers may be positioned proximate to the differentials in order to decrease the vibrations before entering the cabin 104. In some embodiments, the outrigger 108 is composed as a single component (e.g., casted, machined, 3D printed) while in others the outrigger 108 is composed of several components assembled together (e.g., welded, fastened, adhered).

Figure 2:
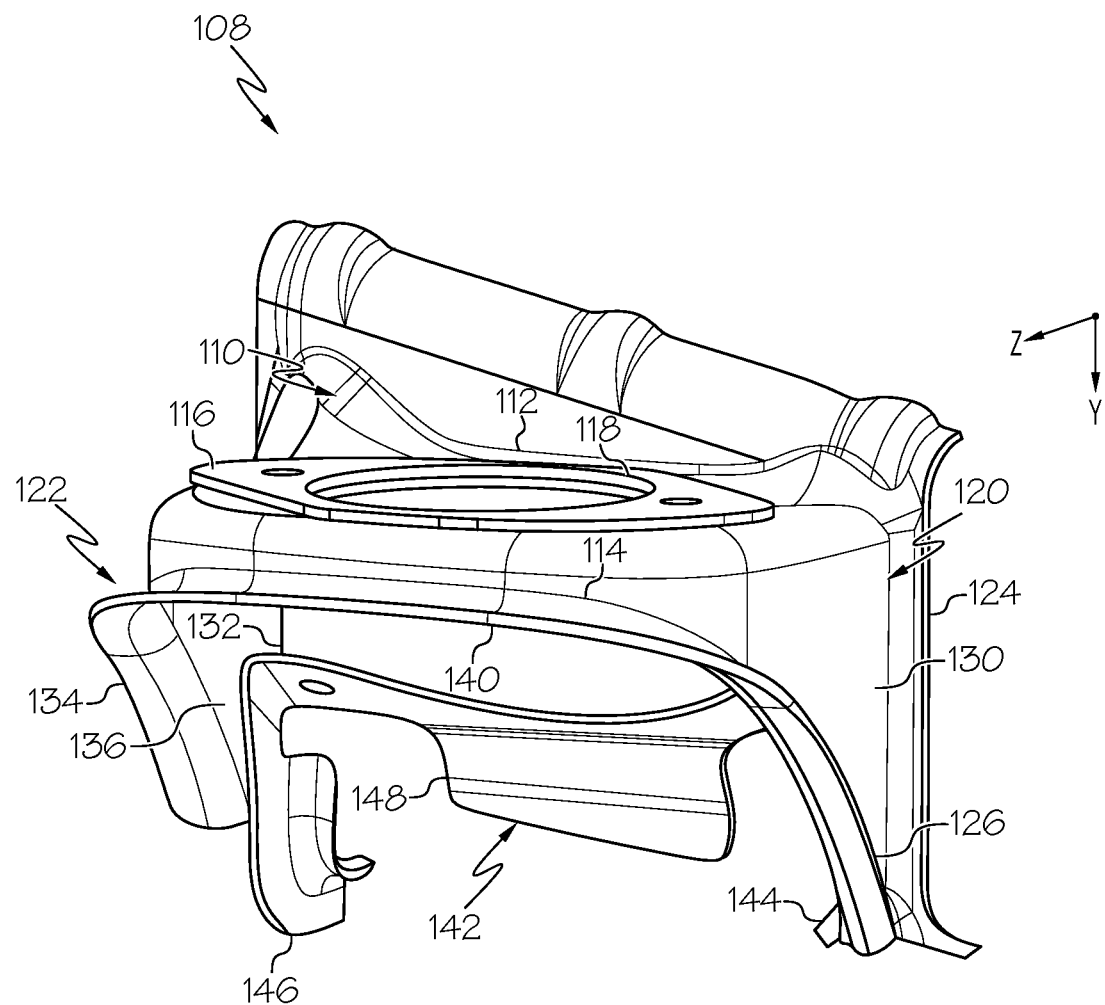
FIG. 2 schematically depicts a perspective view of an outrigger taken along emphasized area A-A of FIG. 1, according to one or more embodiments shown and described herein.

Referring now to FIG. 2, a perspective view of the outrigger 108 taken along emphasized area A-A of FIG. 1, according to one or more embodiments shown and described herein. The outrigger 108 defines a Y-axis which extends vertically (e.g., parallel to the force of gravity) and defines a Z-axis which extends to-and-from the frame vehicle 100.

The outrigger 108 includes a base wall 110 (e.g., top wall). The base wall 110 couples the outrigger 108 to the frame skeleton 102 and extends away from the frame skeleton 102 (e.g., along the Z-axis). The base wall 110 includes a first edge 112 (e.g., border, perimeter) that is proximate to the frame skeleton 102. The base wall 110 further includes a second edge 114 (e.g., border, perimeter) that is positioned opposite to the first edge 112.

The outrigger 108 further includes a top plate 116. The top plate 116 is placed onto the base wall 110 and is configured to provide additional rigidity to the outrigger 108 when the cabin 104 is placed onto the frame skeleton 102. The top plate 116 defines a top aperture 118. The top aperture 118 is one of the locations where the cabin 104 is mounted onto the outrigger 108.

The outrigger 108 further includes a first side wall 120 and a second side wall 122 opposite to the first side wall 120. The first side wall 120 and the second side wall 122 each extend away from the base wall 110 (e.g., along the Y-axis). In some embodiments, the first side wall 120 and the second side wall 122 taper inwardly (e.g., towards the frame skeleton 102) as the first side wall 120 and the second side wall 122 extend away from the base wall 110.

The first side wall 120 includes a first interior edge 124 and a first exterior edge 126 positioned opposite of the first interior edge 124. The first side wall 120 additionally includes a first interior surface 128 (illustrated in FIG. 3) and a first exterior surface 130 positioned opposite the first interior surface 128. The second side wall 122 includes a second interior edge 132 and a second exterior edge 134 positioned opposite of the second interior edge 132. The second side wall further 122 includes a second interior surface 136 and a second exterior surface 138 (illustrated in FIG. 3) positioned opposite the second interior surface 136.

The outrigger 108 further includes a reinforcement flange 140 (e.g., lip, brim, external rib). The reinforcement flange 140 extends along the first exterior edge 126, the second edge 114, and the second exterior edge 134. Along the first exterior edge 126, the reinforcement flange 140 originates at a bottom edge of the first side wall 120 (e.g., along the Y-axis) and curves along the first side wall 120 towards the second edge 114 (e.g., along the Z-axis) while defining a concave cross-sectional shape. Along the second edge 114, the reinforcement flange 140 continues to define the concave profile as it extends along across the outrigger 108 (e.g., perpendicular to the Y-axis and the Z-axis). Along the second exterior edge 134, the reinforcement flange 140 originates from the second edge 114, and curves along the second side wall 122 continuing to define the concave cross-sectional shape. The reinforcement flange 140 then continues towards a bottom edge of the second side wall 122 (e.g., along the Y-axis). At the first junction, between the first exterior edge 126 and the second edge 114, and the second junction, between the second exterior edge 136 and the second edge 114, the reinforcement flange 140 maintains an arcuate profile (e.g., bowed, curved).

The reinforcement flange 140 is configured to structurally connect the base wall 110 to the first side wall 120 and the second side wall 122. While undergoing the breathing mode, the first side wall 120 and the second side wall 122 translate towards and away from the outrigger 108 (e.g., flap). This translation allows for the outrigger 108 to absorb vibrations through the frame skeleton 102. By structurally connecting the first side wall 120 and the second side wall 122 to the base wall 110, the reinforcement flange 140 provides additional stiffness during the breathing mode. This results in less vibrations carrying through the outrigger 108 into the cabin 104.

In some embodiments, the reinforcement flange 140 is integrally formed as a one piece monolithic structure (e.g., casted, 3D printed, machined) with the outrigger 108. In some embodiments, the reinforcement flange 140 is coupled (e.g., welded, fastened) into the outrigger 108. In some embodiments, the reinforcement flange 140 is composed of a thicker material or a different material that the first side wall 120 and the second side wall 122. In this way, the outrigger 108 may designed to provide additional structure along the reinforcement flange 140.

The outrigger 108 further includes a reinforcement bracket 142 (e.g., brace, joint, strut). The reinforcement bracket 142 is coupled to the first interior edge 124 and the second interior edge 132. The reinforcement bracket 142 is configured to structurally connect the first side wall 120 to the second side wall 122. The reinforcement bracket 142 acts to reduce the deformation of the first side wall 120 and the second side wall 122 when the outrigger 108 is undergoing the breathing mode. The reinforcement bracket 142 does so by reinforcing the first side wall 120 and the second side wall 122 and by providing an additional load path for the outrigger 108. By decreasing deformation during the breathing mode, the outrigger 108 is configured to absorb higher resonance vibration from the rear differential 106. In this way, audible noise is reduced in the cabin 104.

The reinforcement bracket 142 includes a first leg section 144 and a second leg section 146 opposite the first leg section 144. The first leg section 144 is coupled to the first interior surface 128 and the second leg section 146 is coupled to the second interior surface 136.

The reinforcement bracket 142 further includes a base section 148. The base section 148 is positioned between the first leg section 144 and the second leg section 146 and is configured to structurally connect the first leg section 144 to the second leg section 146. The base section 148 may define a sloped profile, a triangular profile, a rectangular profile, a circular profile, or any suitable profile in which additional material may be added to the reinforcement bracket. In some embodiments, the base section 148, the first leg section 144, and the second leg section 146 co-operate to define an inverted U-shape form. In some embodiments, the base section 148, the first leg section 144, and the second leg section 146 co-operate to define a U-shape form, an H-shape, or any other suitable shape.

The reinforcement bracket 142 is configured such that the base section 148 is separated (e.g., axially opposed) from the base wall 110. This configuration allows for the reinforcement bracket 142 to be included in the outrigger 108 while still providing clearance for the outrigger 108 to deform during the breathing mode.

In some embodiments, the reinforcement bracket 142 is integrated (e.g., casted, 3D printed, machined) into the outrigger 108. In some embodiments, the reinforcement bracket 142 is coupled (e.g., welded, fastened, adhered) into the outrigger 108. In some embodiments, the reinforcement bracket 142 is composed of a thicker material or a different material that the first side wall 120 and the second side wall 122. In this way, the outrigger 108 may designed to provide additional structure along the reinforcement bracket 142. The first leg section 144 extends along the first side wall 120 towards the top of the outrigger 108 (e.g., along the Y-axis). The first leg section 144 has a narrow portion which extends along the width the outrigger 108 (e.g., perpendicular to the Z-axis and the Y-axis). The narrow portion of the first leg section 144 is contiguous to a first side the base section 148. The base section is wider than the narrow portion of the first leg section 144 and is configured to extend away from the outrigger 108 (e.g., along the Y-axis). By being wider in width, the base section 148 is able to absorb additional load placed onto the outrigger 108. The base section 148 also extends along the width the outrigger 108 towards a second side of the base section 148. The second side of the base section is contagious to the second leg section 146. The second leg section 146 has a narrow portion which extends along the width the outrigger 108 (e.g., perpendicular to the Z-axis and the Y-axis). The second leg section 146 then extends along the second side wall 122 towards the top of the outrigger 108 (e.g., along the Y-axis).

Figure 3:
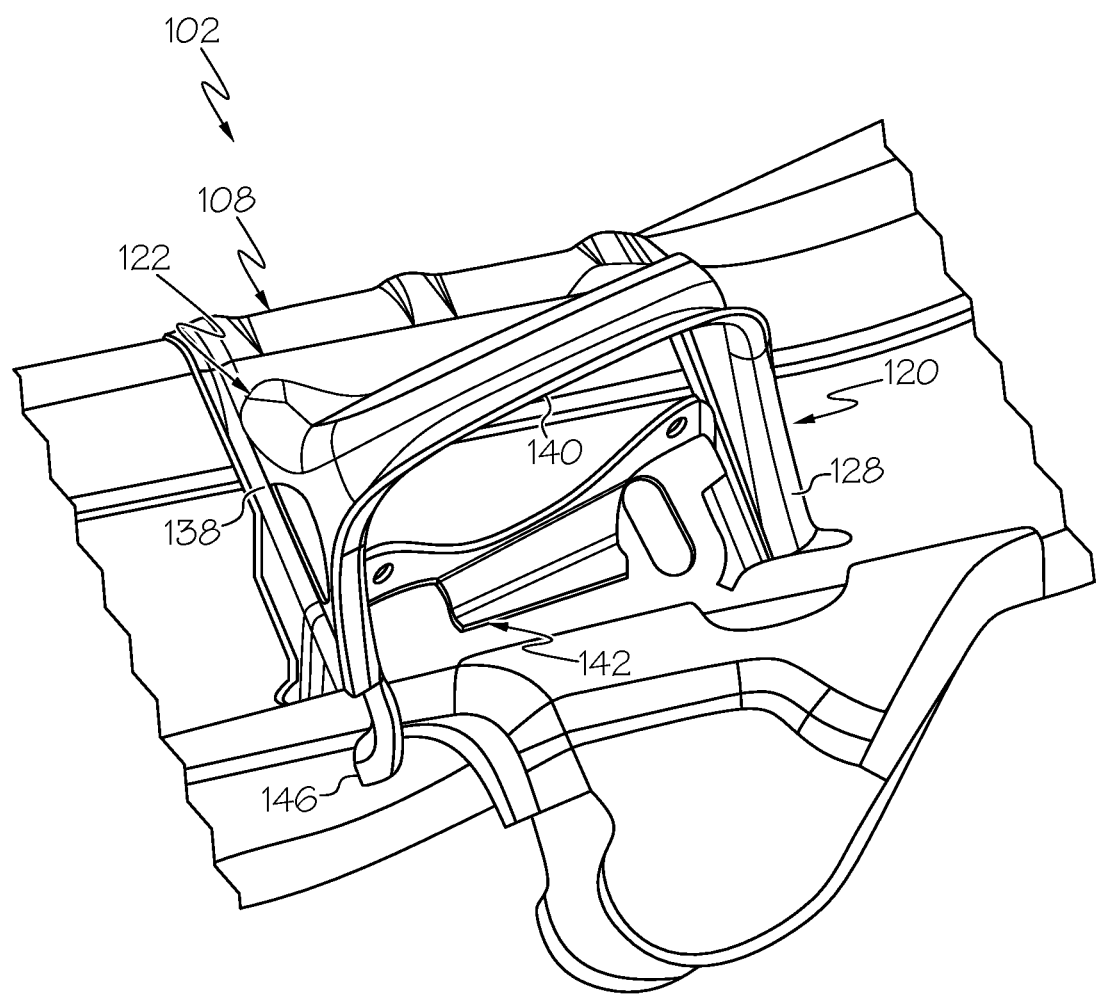
FIG. 3 schematically depicts a perspective view of the frame skeleton taken along emphasized area A-A of FIG. 1, according to one or more embodiments shown and described herein.

Referring now to FIG. 3, a perspective view of the frame skeleton 102 taken along emphasized area A-A of FIG. 1 is shown, according to one or more embodiments shown and described herein. The outrigger 108 is welded, fastened, and/or adhered to the frame skeleton 102. The outrigger 108 may be coupled to the frame skeleton 102 via the first leg section 144, the second leg section 146, the reinforcement bracket 142, and/or the base wall 110.

Figure 4:
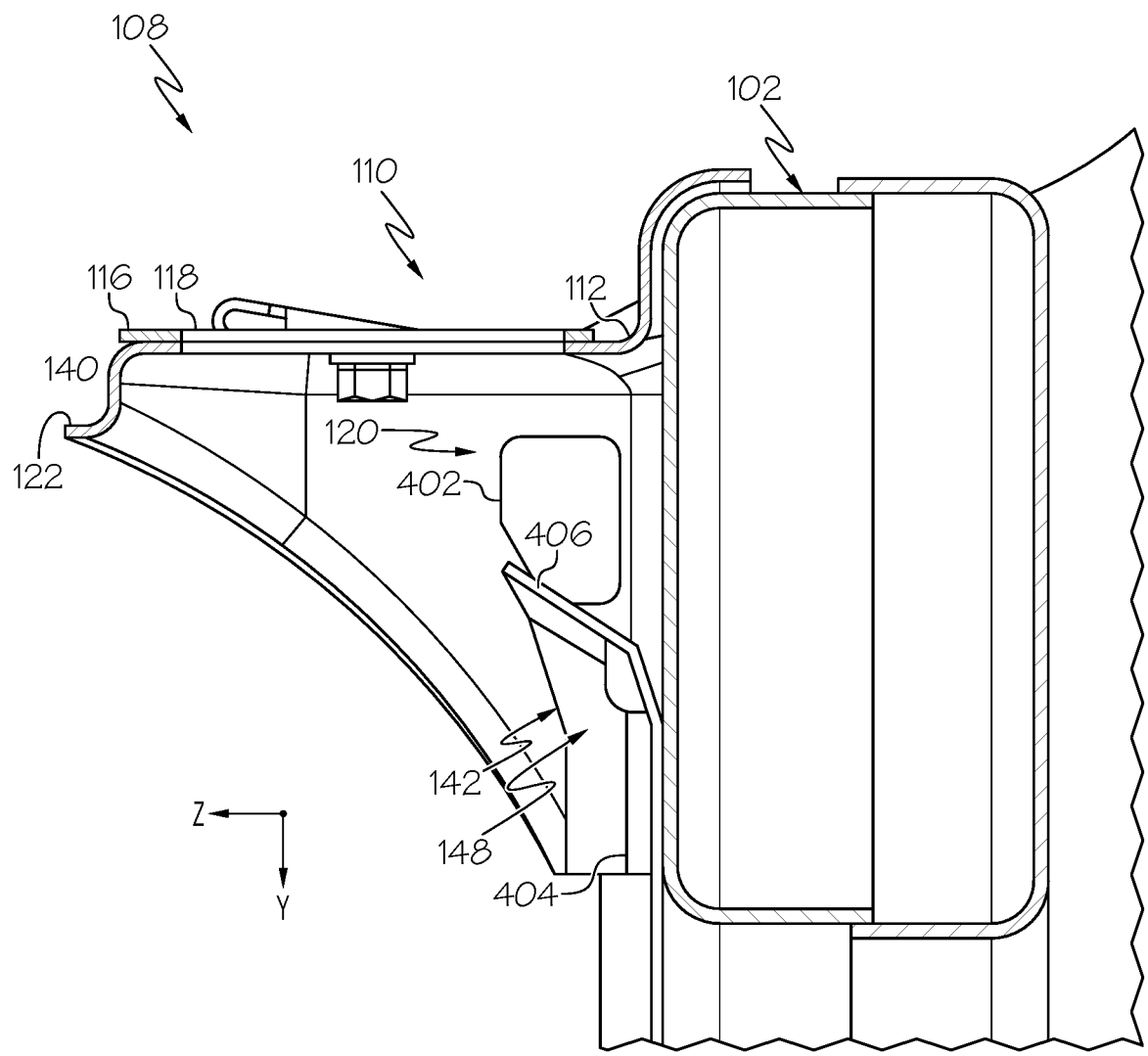
FIG. 4 schematically depicts a side view of the frame skeleton taken along emphasized area A-A of FIG. 1, according to one or more embodiments shown and described herein.

Referring now to FIG. 4, a side view of the frame skeleton 102 taken along emphasized area A-A of FIG. 1 is shown, according to one or more embodiments shown and described herein. The first side wall 120 and the second side wall 122 may each define a side aperture 402. The side aperture 402 reduces the weight of the outrigger 108. In this way, the outrigger 108 may incorporate the reinforcement flange 140 and the reinforcement bracket 142 without adding mass to the outrigger 108. The outrigger 108 couples onto the frame skeleton 102 via an upright wall positioned near the base wall 110. The upright wall curves upon a top surface of the frame skeleton 102, thereby increasing the surface area coupling the outrigger 108 to the frame skeleton 102. Additionally, the first interior edge 124 and the second interior edge 132 extend along a surface of the frame skeleton 102, thereby increasing the surface area coupling the outrigger 108 to the frame skeleton 102. In this way, the rigidity and stiffness of the outrigger 108 is increased.

In some embodiments, the reinforcement bracket 142 further includes a bottom portion 404 and a top portion 406 contiguous to the bottom portion 404. The bottom portion 404 extends along the surface of the frame skeleton 102 (e.g., along the Y-axis). The top portion 406 extends away from the frame skeleton 102 and is configured to define a space away form an undersurface of the base wall 110, thereby providing clearance for the reinforcement bracket 142 and the other components of the outrigger 108 to deform during the breathing mode.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. An outrigger comprising:
   a base wall having a first edge and an opposite second edge;
   a first side wall and an opposite second side wall, each side wall extending from the base wall and each side wall comprising an interior edge, an opposite exterior edge, and an inner surface;
   a reinforcement flange extending along the exterior edges of the first side wall and the second side wall and the second edge; and
   a reinforcement bracket directly coupled to the interior edges of the first side wall and the second side wall.

2. The outrigger of claim 1, wherein the reinforcement bracket comprises a pair of leg sections and a base section contiguous to the pair of leg sections, each of the pair of leg sections being contiguous to at least one of the inner surfaces of the first side wall and the second side wall such that the base section is spaced apart from the base wall.

3. The outrigger of claim 2, wherein the first side wall and the second side wall each taper inwardly towards the reinforcement bracket as the first side wall and the second side wall extend from the base wall.

4. The outrigger of claim 2, wherein the pair of leg sections and the base section form an inverted U-shape.

5. The outrigger of claim 1, wherein the outrigger is a rear cab mount frame outrigger and is coupled to a vehicle frame member.

6. The outrigger of claim 5, wherein the reinforcement bracket is coupled to the vehicle frame member.

7. The outrigger of claim 5, wherein a first portion of the reinforcement bracket extends parallel to the vehicle frame member and a second portion of the reinforcement bracket extends towards the second edge of the base wall.

8. The outrigger of claim 5, wherein the first edge is proximate to an opening of the vehicle frame member.

9. The outrigger of claim 1, wherein the first side wall defines a first aperture and the second side wall defines a second aperture.

10. An outrigger comprising:
    a base wall having a first edge and an opposite second edge;
    a first side wall and an opposite second side wall, each side wall extending from the base wall and each side wall comprising an interior edge, an opposite exterior edge, and an inner surface;
a reinforcement flange extending along the exterior edges of the first side wall and the second side wall and the second edge; and
a reinforcement bracket coupled to the interior edges of the first side wall and the second side wall,
wherein the outrigger is a rear cab mount frame outrigger and is coupled to a vehicle frame member, and
wherein the first edge is proximate to an opening of the vehicle frame member.

11. The outrigger of claim 10, wherein the reinforcement bracket comprises a pair of leg sections and a base section contiguous to the pair of leg sections, each of the pair of leg sections being contiguous to at least one of the inner surfaces of the first side wall and the second side wall such that the base section is spaced apart from the base wall.

12. The outrigger of claim 11, wherein the first side wall and the second side wall each taper inwardly towards the reinforcement bracket as the first side wall and the second side wall extend from the base wall.

13. The outrigger of claim 11, wherein the pair of leg sections and the base section form an inverted U-shape.

14. The outrigger of claim 10, wherein the reinforcement bracket is coupled to the vehicle frame member.

15. The outrigger of claim 10, wherein a first portion of the reinforcement bracket extends parallel to the vehicle frame member and a second portion of the reinforcement bracket extends towards the second edge of the base wall.

16. An outrigger comprising:
a base wall having a first edge and an opposite second edge;
a first side wall and an opposite second side wall, each side wall extending from the base wall and each side wall comprising an interior edge, an opposite exterior edge, and an inner surface;
a reinforcement flange extending along the exterior edges of the first side wall and the second side wall and the second edge; and
a reinforcement bracket coupled to the interior edges of the first side wall and the second side wall,
wherein the first side wall defines a first aperture and the second side wall defines a second aperture.

17. The outrigger of claim 16, wherein the reinforcement bracket comprises a pair of leg sections and a base section contiguous to the pair of leg sections, each of the pair of leg sections being contiguous to at least one of the inner surfaces of the first side wall and the second side wall such that the base section is spaced apart from the base wall.

18. The outrigger of claim 17, wherein the first side wall and the second side wall each taper inwardly towards the reinforcement bracket as the first side wall and the second side wall extend from the base wall.

19. The outrigger of claim 17, wherein the pair of leg sections and the base section form an inverted U-shape.

20. The outrigger of claim 16, wherein the outrigger is a rear cab mount frame outrigger and is coupled to a vehicle frame member, wherein the reinforcement bracket is coupled to the vehicle frame member, and wherein a first portion of the reinforcement bracket extends parallel to the vehicle frame member and a second portion of the reinforcement bracket extends towards the second edge of the base wall.

* * * * *